No. 627,071. W. B. BENHAM. Patented June 13, 1899.
FILTER AND CLEANER.
(Application filed Aug. 17, 1898.)
(No Model.)
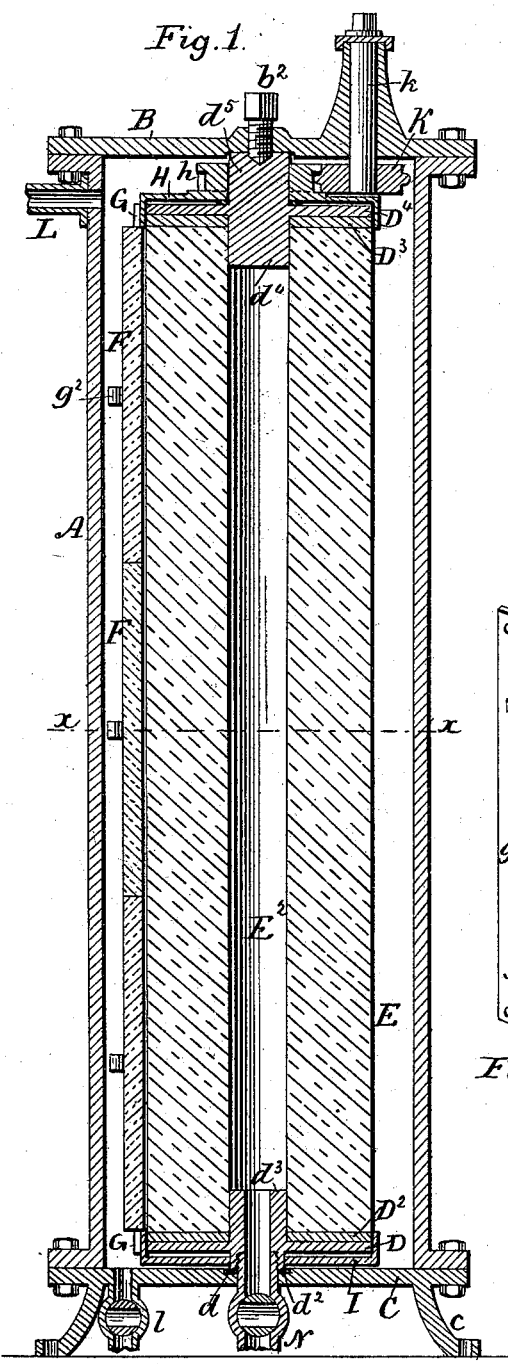
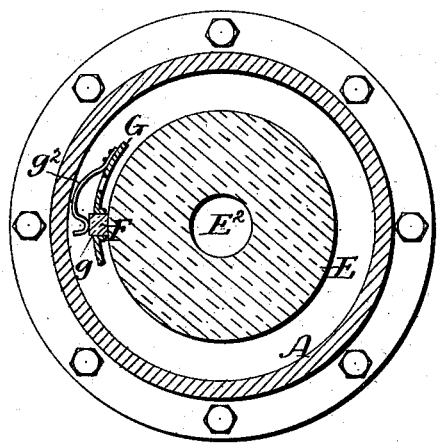
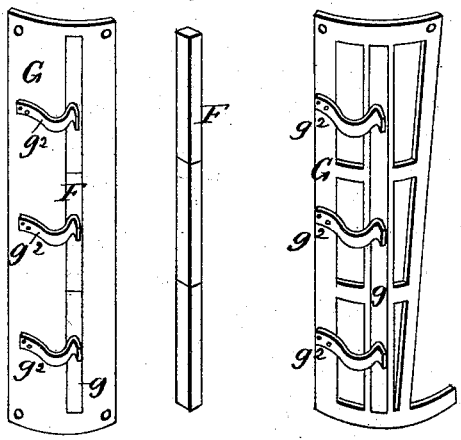
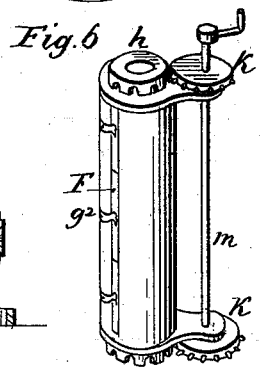
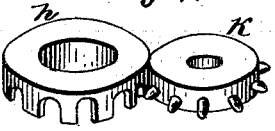
WITNESSES
INVENTOR
William B. Benham,
by E. E. Masson, Attorney.

UNITED STATES PATENT OFFICE.

WILLIAM B. BENHAM, OF WASHINGTON, DISTRICT OF COLUMBIA, ASSIGNOR, BY DIRECT AND MESNE ASSIGNMENTS, TO STEPHEN B. PRIEST, OF SAME PLACE, AND WILLIAM W. LAMBERT, OF PHILADELPHIA, PENNSYLVANIA.

FILTER AND CLEANER.

SPECIFICATION forming part of Letters Patent No. 627,071, dated June 13, 1899.

Application filed August 17, 1898. Serial No. 688,780. (No model.)

*To all whom it may concern:*

Be it known that I, WILLIAM B. BENHAM, a citizen of the United States, residing at Washington, in the District of Columbia, have invented certain new and useful Improvements in Filters and Cleaners, of which the following is a specification, reference being had therein to the accompanying drawings.

My invention relates to that class of filters in which the water is passed through artificial or natural stone filtering medium which is incased in a metal barrel and in which the water may be passed through the filtering medium or may be caused to flow around it.

The object of my invention is to provide peculiar means by which the deposit left by the water in the process of filtration may be conveniently removed from the wall or side of the filtering medium and from the filter without necessitating the removal of the parts thereof.

The invention consists in the parts and combination of parts hereinafter described, and pointed out in the claims.

In the accompanying drawings, Figure 1 is a central vertical section of a filter and cleaner constructed in accordance with my invention. Fig. 2 is a horizontal section on line $x\ x$ of Fig. 1. Fig. 3 represents, on a smaller scale, in perspective the scraper-carrier and its scrapers. Fig. 4 is a perspective view of the scraper, consisting of three lengths of baked-emery composition. Fig. 5 is a perspective view of a modified form of scraper-carrier, being of skeleton form and intended to be suspended from its upper end only. Fig. 6 is a perspective view of the scraper-carrier provided with operating-gears at the top and bottom, their connecting-shaft being intended to be beyond the periphery of the filtering material. Fig. 7 is a perspective view of the sprocket-wheels used to actuate the cleaner.

In said drawings, A represents a metal cylinder or barrel having a head B bolted to its upper end and a base C similarly bolted to its lower end. Said base has feet $c$, by which it can be secured upon a suitable support. Within the lower portion of the cylinder A is placed a disk D, having centrally of its under side a hollow boss $d$, that is received upon a thin washer $d^2$, placed in a shallow cavity formed in the top of the base C. The disk D has also on its top side a hollow boss $d^3$, that constitutes the central guide for the filtering-cylinder E. Said cylinder consists of any plastic or other material having sufficient porosity to allow the water to be filtered to pass through its walls into its central chamber $E^2$. To form a tight-fitting joint between the bottom of the cylinder E and the top of the disk D, a washer $D^2$, of artificial leather or other well-known packing material, is interposed. On the upper end of the filtering-cylinder E rests a similar washer $D^3$, and upon the latter rests a metal disk $D^4$, having centrally thereof a pendent boss $d^4$, that enters a short distance into the central chamber $E^2$, and a top boss $d^5$, the upper end of the latter being received into a shallow depression made centrally in the under side of the head B; but to insure accuracy in centering the disk $D^4$ or its boss $d^5$ in the center of the head B the latter is provided with a screw-bolt $b^2$, passing vertically through the center of said head and having its conical point received in a conical cavity in the top boss $d^5$ of the disk $D^4$.

The above-described parts have comparatively but little novelty; but the difficulty with the majority of filters has been to keep them clean automatically and substantially as effective after long use as when new; and the object of my invention is to provide the filter with means to remove the mud and other deposits adhering to the surface of the cylinder E without the use of brushes consisting of tufts of bristles or of india-rubber or scrapers of metal, which are objectionable.

In this improvement the scraper or scrapers F consist of one or more lengths of a plastic composition, as clay and coarse emery, molded in a rectangular form and suitably baked. The scraper is made, preferably, of a series of short lengths placed end to end, because it is difficult to have long scrapers baked free of spring or twist. The scraper is supported by a carrier G, preferably of sheet metal, as galvanized sheet-iron or aluminium, in which is formed a rectangular slit $g$, lengthwise thereof, with its edges bent inwardly to increase the width of the cheeks of the slit, as they act as guides for the sides of the scraper. To retain each length of the scraper F normally in contact with the periphery of the cylinder E, a leaf-spring $g^2$ is made to bear upon the central portion of the back of each length of the scraper. One end of each spring is riveted in a horizontal position to the outer face of the carrier G, while the opposite end is partly looped and bent inwardly to continue to bear upon the scraper F even when the latter is worn very thin.

The carrier G (shown in Figs. 1, 2, and 3) has its upper end secured to the flanged periphery of a disk H, which is mounted loosely around the boss $d^5$ of the disk $D^4$. The lower end of the carrier G is secured to the flanged periphery of a disk I, that is free to rotate around the boss $d$ of the bottom disk D. To occasionally rotate the scraper-carrier around the filtering-cylinder E, the upper disk H has secured upon its top or integral therewith a gear-wheel $h$, preferably of sprocket form, having wide pockets in its periphery to receive the pointed sprocket-teeth of a sprocket-gear K, which is mounted upon the lower end of a shaft $k$, made to pass through a bearing-boss formed upon the head B of the barrel. The upper end of the shaft $k$ has a square head adapted to receive a crank-handle or other suitable means to rotate it. By the use of sprocket-gears, as shown, there is no danger of having said gears clogged and rendered immovable by the mud deposits generally found in recesses of the filter.

The scraper-carrier shown in Fig. 5 is intended to be made in part of cast metal and to be secured only at the top to the disk $D^4$; but to be well balanced two carriers should be used, one on opposite sides, and to be strapped to each other at the bottom.

In the modification shown in Fig. 6 the scraper-carrier is provided with sprocket-gears at the top and bottom that are connected by a shaft extending the whole length of said carrier.

In operation the water enters the filter-barrel at the top through the pipe L and can be drawn unfiltered through the bottom pipe $l$, which is provided with a controlling-faucet, as usual, or it may percolate through the walls of the filtering-cylinder E and be drawn filtered from the bottom pipe N.

Having now fully described my invention, I claim—

1. In a filter the combination of the side walls of a barrel, its head provided with a central screw-bolt, the base of the barrel, a bottom disk having its bottom boss resting upon said base, a hollow filtering-cylinder resting upon said disk, and an upper disk resting upon said cylinder and having an upper boss in engagement with the central screw-bolt of the barrel-head, substantially as described.

2. The combination of the side walls of a barrel, its head provided with a central screw-bolt and a shaft-bearing boss, the base of the barrel, the disk D having its bottom boss resting upon said base, a hollow filtering-cylinder resting upon said disk, an upper disk $D^4$ resting upon said cylinder and having an upper boss $d^5$ retained by the central screw-bolt of the barrel-head, a disk H and sprocket-wheel $h$ encircling the boss $d^5$, a scraper-carrier secured to the disk H and provided with a groove lengthwise thereof, abrading-scrapers within said groove and springs secured to the scraper-carrier and bearing upon the scrapers, substantially as described.

3. The combination of a metal barrel closed at both ends a porous filtering-cylinder therein, metal disks at each end, each having a central upper and lower boss, a flanged disk H and gear $h$ loosely encircling the upper boss of the metal upper disk, a gear K meshing with the gear $h$ and having its shaft passing through the head of the barrel, a scraper-carrier secured to the disk H and provided with a groove lengthwise thereof, an abrading-scraper within said groove, and a spring secured to said carrier and bearing upon the scraper, substantially as described.

In testimony whereof I affix my signature in presence of two witnesses.

WILLIAM B. BENHAM.

Witnesses:
EDWARD S. AHERN,
PHILIP DONOHOE.